INVENTORS
WILLIAM G. BRUSSALIS, JR
GLENN E. BOST

Dec. 4, 1962 W. G. BRUSSALIS, JR., ET AL 3,066,763
INVERTED CONTROL ROD LOCK-IN DEVICE
Filed May 11, 1961 3 Sheets-Sheet 2

INVENTORS
WILLIAM G. BRUSSALIS, JR.
GLENN E. BOST
BY

United States Patent Office 3,066,763
Patented Dec. 4, 1962

3,066,763
INVERTED CONTROL ROD LOCK-IN DEVICE
William G. Brussalis, Jr., and Glenn E. Bost, Pittsburgh, Pa., assignors, by mesne assignments, to the United States of America as represented by the United States Atomic Energy Commission
Filed May 11, 1961, Ser. No. 109,468
1 Claim. (Cl. 188—67)

The present invention relates to safety devices for nuclear reactor control rods and is particularly applicable for use with pressurized water reactors of the type designed for naval service in which the control rods enter the reactor vessel from the top and move vertically therein. Since it is conceivable that a ship powered by such a reactor may capsize, it is required that a mechanism be provided to prevent the control rods from dropping out of the reactor core under the influence of gravity, thereby increasing the reactivity of the rector. The mechanism for preventing the control rods from dropping out of the reactor core must be simple in construction, reliable in operation, and should not prevent the control rod from moving into the reactor core in the event of a scram. The term scram refers to a forced reactor shutdown and in those reactors for which the present invention would be applicable, a scram would be accomplished by the rapid forced insertion of the control rods into the reactor core.

It is the object of this invention to provide a control rod lock-in device having the foregoing capabilities.

The lock-in device of this invention is mounted within the tubular control rod drive mechanism housing and is surrounded by the reactor primary coolant. The device consists essentially of a counterbalanced pivoted armature assembly having a toothed reciprocable insert carried on one end of the armature assembly and engageable with threads on the control rod drive lead screw. Arms at the other end of the armature assembly are in contact with coiled springs which hold the toothed insert in engagement with the control rod lead screw. The sliding insert is spring loaded from the top to prevent possible binding, by thermal expansion, of the lead screw against the teeth of the device when locked. Beveling on the upper face of the insert teeth allows the lead screw to rachet during power failure, so that the latter can move into the reactor core during scram conditions. However, the lower face of the teeth are not beveled and positively prevent the lead screw from moving out of the reactor core. An electromagnet is mounted on the outside of the control rod drive mechanism housing adjacent the armature assembly. When energized, the electromagnet attracts the armature and thereby disengages the teeth from the lead screw to permit normal operation of the control rod mechanism.

The device may be more fully understood by reference to the appended drawings wherein FIG. 1 is a cross section taken vertically through the device, a portion of the body assembly being broken away to show one of the two coiled latching springs. As shown in FIG. 1, the locking device is in engagement with threads of the control rod lead screw.

*The Body Assembly*

Figure 1:
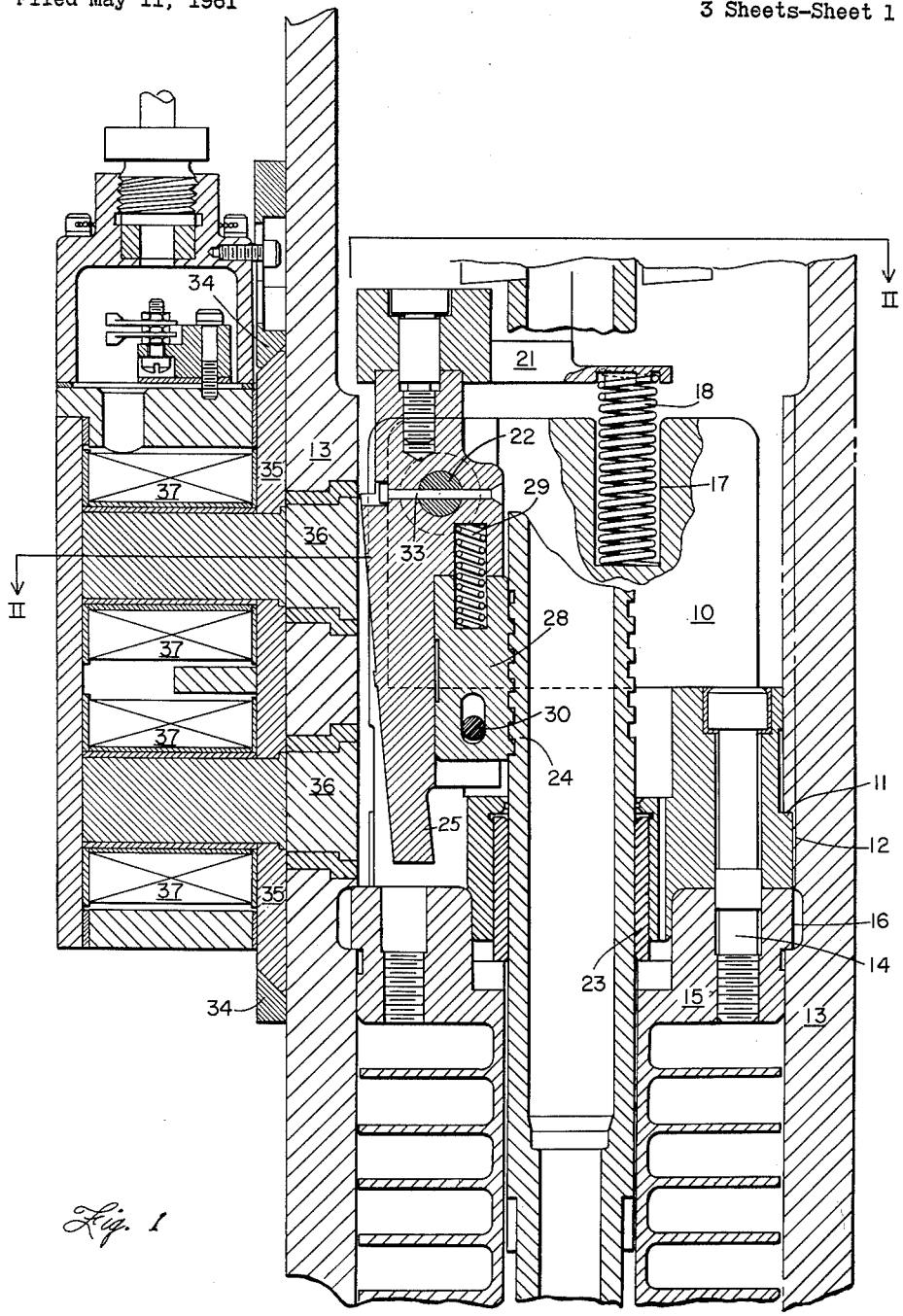

The body 10 of the lock-in assembly is provided with lugs 11 which engage recesses 12 in the tubular control rod mechanism housing 13. The body is installed over the lead screw and is firmly secured in place by means of three bolts 14, arranged at 120° intervals about the lower periphery of the body and extending into an annular plate 15 which is in turn secured at its outer circumference to the mechanism housing 13 by means of lugs 16 (FIG. 1).

Figure 2:
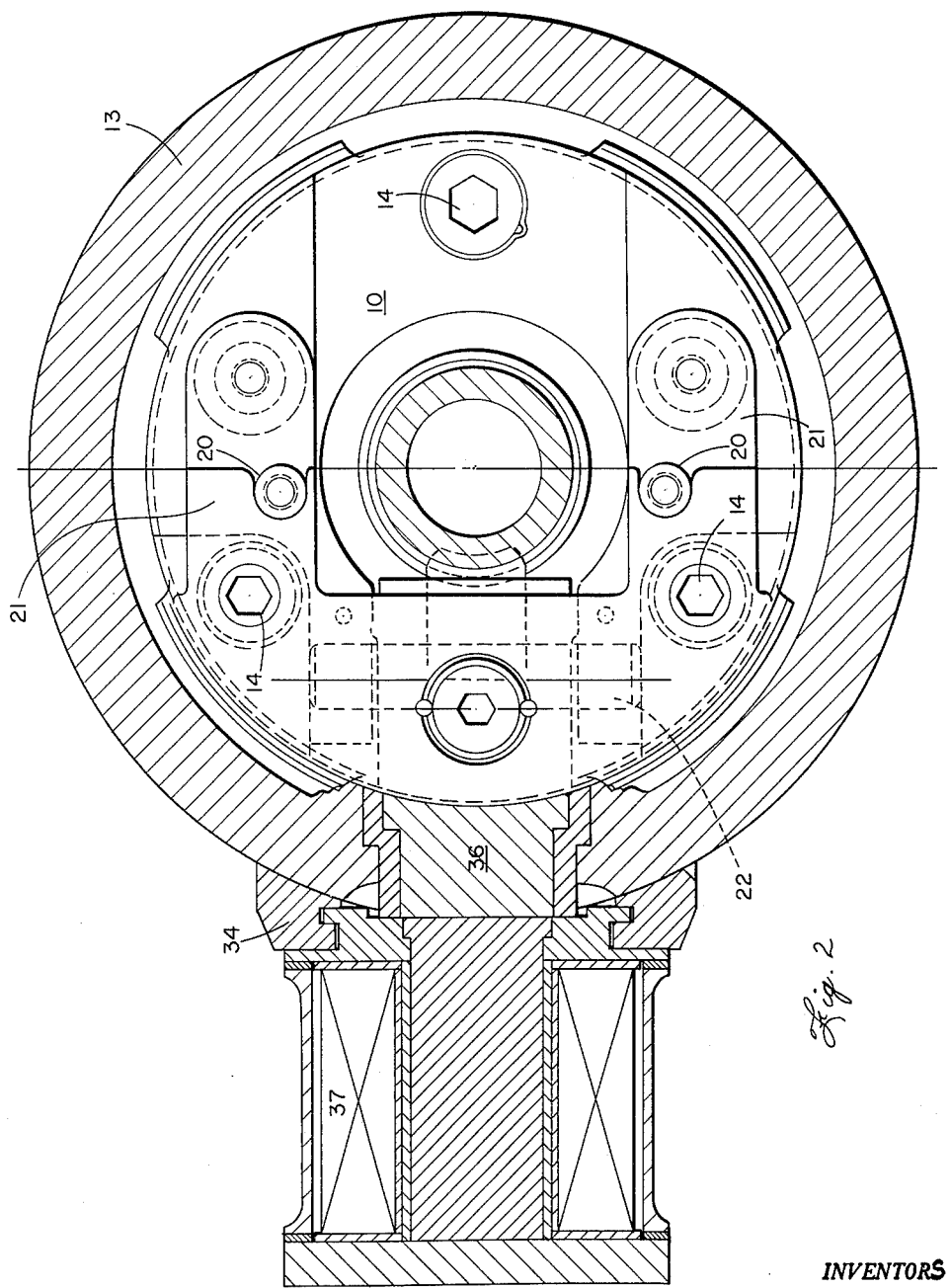
FIG. 2 is a cross section taken along the line II—II of FIG. 1.

Two vertical bore holes 17 in the top of the body 10 (FIG. 1) house the two latching springs 18. Two threaded bore holes 19, adjacent the bore holes 17, receive the ends of an installing tool (not illustrated). The tool passes through openings 20 (FIG. 2) in the arms 21 of the armature assembly and depresses the arms against springs 18 so that the body assembly can be lowered over the lead screw for installation, after which the tool is removed.

The body 10 is also provided with a horizontal bore to receive the pivot pin 22 for the armature assembly. The bushing 23 for the control rod lead screw 24 is press fitted into the bottom portion of the body 10.

*The Armature Assembly*

The armature assembly consists essentially of an armature 25 pivoted on pivot pin 22 and counterbalanced by means of a weight 26 secured to the armature by a bolt 27. A pair of arms 21 forming an extension of the armature counterweight 26, receive the ends of the two latching springs 18.

Figure 3:
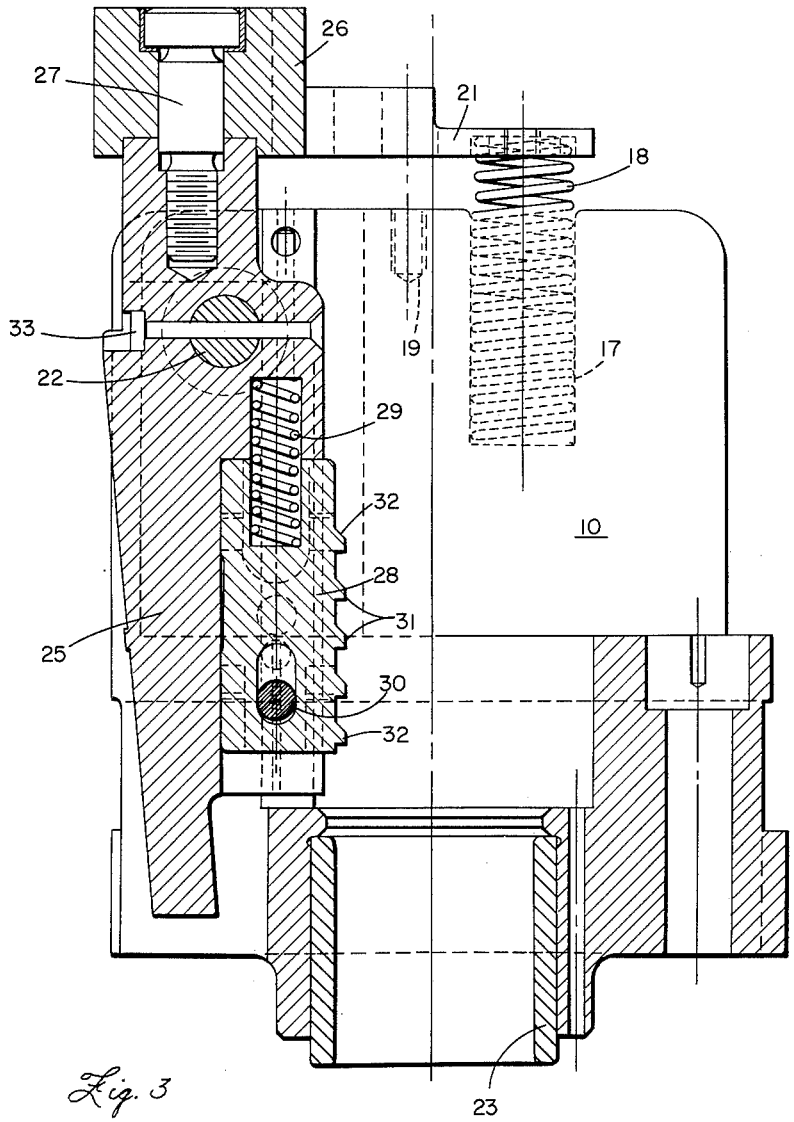
FIG. 3 is a cross section of the armature assembly showing the pin and spring arrangement which permits the toothed armature insert to slide in the armature assembly. This figure further shows the beveled upper surface of the teeth by means of which the control rod lead screw can move into the reactor core but not out of the same when the teeth are engaged.

The armature insert is a sliding block 28, spring loaded from the top by means of a coiled spring 29 and vertically movable over a pin 30 mounted in the armature (FIGS. 1 and 3). As shown in FIG. 3, the teeth 31 of the armature insert are beveled on their top surfaces 32 so that the control rod lead screw can ratchet past them in the downward direction. Ratcheting increases scram time by 15 percent. However, in normal scramming where there is no loss of power to the armature circuit, the teeth on the armature insert are held out of engagement with the lead screw so that there is no lost time due to the lock-in device. The armature is secured to the pivot by means of a pin 33. The counterweight serves to minimize pivoting moments during shock.

*The Electromagnet Assembly*

The electromagnet assembly is affixed to the outside of the mechanism housing adjacent to the lock-in assembly by means of a wedge type mounting 34. The magnetic circuit includes the back cover plate 35 of the electromagnet, two plugs 36 welded in the wall of the mechanism housing, a pair of coils 37 and conventional electrical connections.

*Operation*

In normal reactor operation the electromagnet assembly is energized and attracts the armature 25, thereby compressing the latching springs 18 and withdrawing the toothed armature insert to a position out of engagement with the control rod lead screw. On failure of power to the electromagnet, the latching springs pivot the armature assembly about the pivot 22, thereby bringing the toothed insert into engagement with the lead screw. Because of the beveled upper surfaces of the teeth, the control rod lead screw can ratchet past the teeth and into the reactor core in the event that power is accidentally lost during a scram. Withdrawal of the lead screw from the reactor core is prevented when the armature insert teeth are in contact with the lead screw. An important feature of the insert is the provision of means permitting the insert a limited vertical movement over its pin 30. This prevents binding due to conditions of shock, temperature, pressure, and lead screw position.

The lock-in device of this invention is fail-safe since it will automatically prevent withdrawal of the reactor control rod lead screw in the event of a failure of power to the electromagnet, thereby precluding withdrawal of the rod even if the reactor vessel is inverted. The mechanism, on the other hand, can not prevent insertion of the control rod regardless of whether the electromagnet is energized or de-energized. The lock-in mechanism has the further advantage of simplicity of design and ruggedness of construction.

While the specific embodiment of this invention is directed to means for locking a tubular control rod lead screw, it is to be understood that the invention is of general application and may be employed with any tube or rod having external threads engageable with the teeth on the armature insert.

We claim:

A lock-in device which permits a threaded rod to be translated in one direction and held against translation in the opposite direction which comprises a body assembly surrounding the rod, an armature assembly pivoted to the body assembly, an insert spring biased toward said one direction and slidably mounted on said armature assembly with a slot and pin on said armature and insert cooperating to allow limited movement of said insert in said one and said opposite directions, teeth on the insert, beveled surfaces on the sides of the teeth opposite to said one direction of translation and surfaces at right angles to said one and said opposite directions on the other side of said teeth, said teeth surfaces cooperating with the corresponding threads of the threaded portion of said rod to permit the rod to ratchet by pivoting said armature assembly away from said rod when the rod is forced in said one direction and causing said rod to be locked when said rod is forced in said opposite direction, latching springs compressed by arms of the armature assembly and biasing the same about its pivot to bring the teeth into latching engagement with threads on the rod, and an electromagnet mounted adjacent the armature for biasing the armature assembly in opposition to the latching springs to disengage the teeth from the rod.

References Cited in the file of this patent

UNITED STATES PATENTS

| | | |
|---|---|---|
| 2,365,521 | Brooke | Dec. 19, 1944 |
| 2,531,198 | Bruet | Nov. 21, 1950 |
| 2,627,945 | Hooker | Feb. 10, 1953 |